United States Patent
Martinez et al.

(10) Patent No.: US 6,878,926 B2
(45) Date of Patent: Apr. 12, 2005

(54) DIFFERENTIAL MEASUREMENT SYSTEM BASED ON THE USE OF PAIRS OF BRAGG GRATINGS

(75) Inventors: Christophe Martinez, Grenoble (FR); Pierre Ferdinand, Houilles (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/480,631

(22) PCT Filed: Jun. 3, 2002

(86) PCT No.: PCT/IB02/01986

§ 371 (c)(1),
(2), (4) Date: Dec. 22, 2003

(87) PCT Pub. No.: WO03/001156

PCT Pub. Date: Jan. 3, 2003

(65) Prior Publication Data

US 2004/0206892 A1 Oct. 21, 2004

(30) Foreign Application Priority Data

Jun. 21, 2001 (FR) .............................. 01 08166

(51) Int. Cl.[7] .............................. G01J 1/04; G02B 6/00
(52) U.S. Cl. .............................. 250/227.14; 250/227.18; 385/13
(58) Field of Search ................ 250/227.14, 227.16, 250/227.18, 227.23, 227.24, 227.28; 385/10, 12, 13; 356/73.1

(56) References Cited

U.S. PATENT DOCUMENTS

| | | | |
|---|---|---|---|
| 5,563,967 A | 10/1996 | Haake | |
| 6,024,488 A | 2/2000 | Tsao et al. | |
| 6,659,640 B2 | * 12/2003 | Ruffa | ......................... 374/161 |
| 6,785,004 B2 | * 8/2004 | Kersey et al. | .............. 356/478 |

FOREIGN PATENT DOCUMENTS

FR 2 768 175 3/1999

OTHER PUBLICATIONS

R.W. Fallon, et al., "Identical broadband chirped grating interrogation technique for temperature and strain sensing", Electronics Letters, vol. 33, No. 8, pp. 705–707, Apr. 10, 1997.
D.A. Jackson, et al., "Simple multiplexing scheme for a fiber–optic grating sensor network", Optics Letters, vol. 18, No. Jul. 15, 1993.
Electronics Letters, vol. 33, No. 8, pp. 705–707 Apr. 10, 1997.
L.A Ferreira, et al, "Temperature and strain insensitive bend measurements with D–type fibre Bragg gratings", WE 2–2, pp. 5–8.

* cited by examiner

Primary Examiner—Kevin Pyo
(74) Attorney, Agent, or Firm—Oblon, Spivak, McClelland, Maier & Neustadt, P.C.

(57) ABSTRACT

A differential measurement system using pairs of Bragg gratings including at least one optical sensor having two Bragg gratings in two optical waveguides and having sensitivities adjusted so that respective spectra of the two gratings have a relative spectral shift dependent on a parameter or parameters to be measured. The system also includes an optical source to supply light to the two optical waveguides to interrogate them, a mechanism enabling light to pass successively through the two Bragg gratings of the same sensor, photodetectors to measure the power level of light having passed only through one of the two optical waveguides and the power level of light having passed successively through the two optical waveguides, and a processor to process the power levels and supply values of the parameter or parameters measured. The system is applicable in particular to measurements of temperatures, stresses, and pressures.

18 Claims, 6 Drawing Sheets

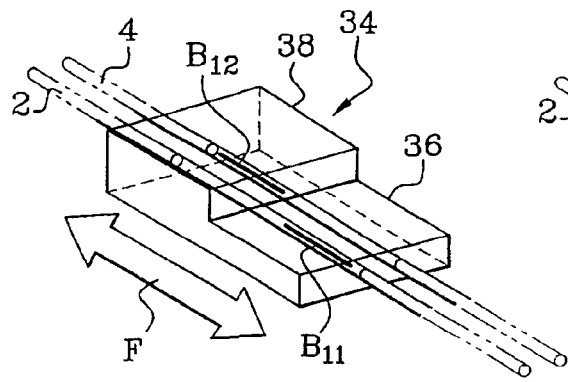 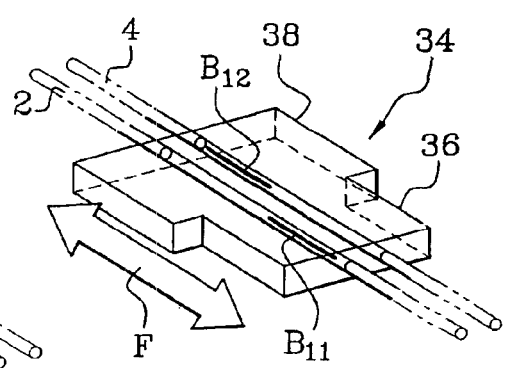
Fig. 9A  Fig. 9B
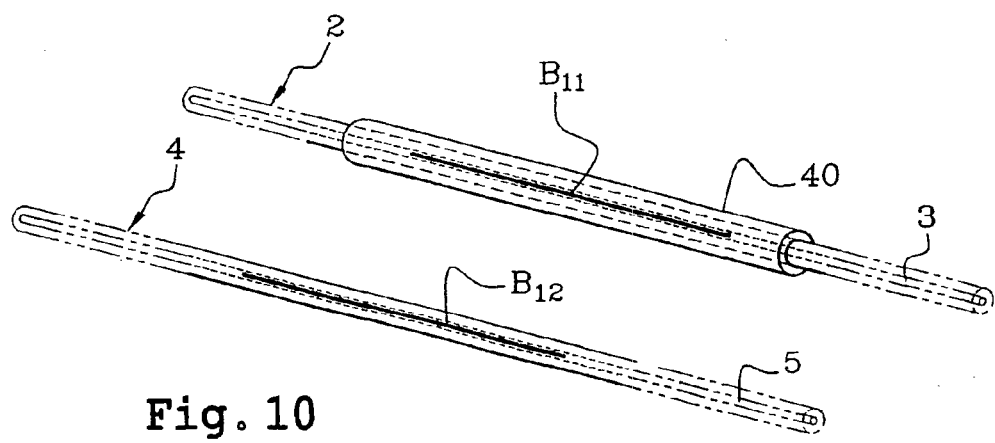
Fig. 10
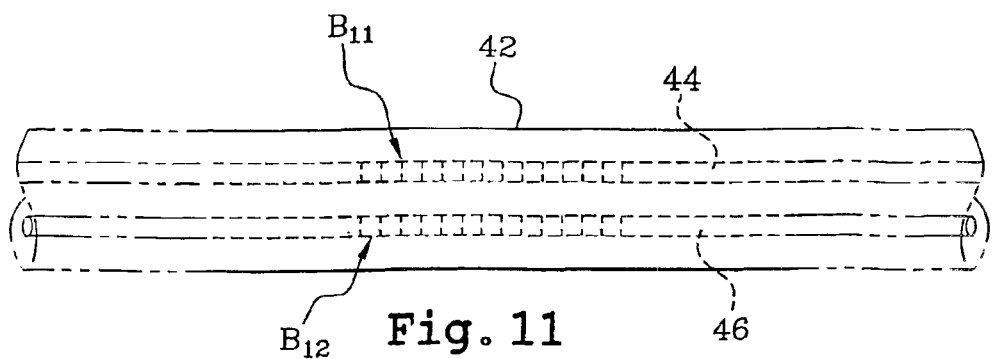
Fig. 11

DIFFERENTIAL MEASUREMENT SYSTEM BASED ON THE USE OF PAIRS OF BRAGG GRATINGS

TECHNICAL FIELD

The present invention relates to a measurement system which uses Bragg gratings.

In particular, it is applicable to measurements of temperatures, stresses and pressures.

DESCRIPTION OF THE PRIOR ART

Reference may be made to the following documents:

[1] D. A. Jackson, A. B. Lobo Ribeiro, L. Reekie and J. L. Archambault, "Simple multiplexing scheme for a fibre-optic grating sensor network" Optics Letters, Vol. 19(14), 1993, pp 1192–1194

[2] R. W. Fallon, L. Zhang, A. Gloag and I. Bennion, "Identical broadband chirped grating interrogation technique for temperature and strain sensing" Electronics Letters, Vol. 33(8), 1997, pp 705–707

[3] L. A. Ferreira, F. M. Araujo, J. L. Santos and F. Farahi, "Temperature and strain insensitive bend measurements with D-type fibre Bragg gratings" OFS (Optical Fibre Sensors) Conference 14, WE 2—2, Venice, October 2000.

Documents [1] and [2] disclose measurement techniques which use Bragg gratings and which are based on analysing the overlap of two spectra from such gratings, that is to say, on the overlap integral of a pair of Bragg gratings.

Note that only one of the two gratings is a transducer while the second grating enables a spectral signal to be analysed.

Furthermore, the technique described in document [2] uses chirped gratings which are fairly difficult to manufacture and susceptible to strain because of their length, thus inducing noise on the signal measured.

Document [3] discloses a measurement technique which uses a sensor comprising a pair of Bragg gratings which form transducers. This technique uses an analysis, which is completely spectral, of the shifts of the signals supplied by these transducers and is therefore not based on the principle of the overlap integral of the spectra.

It is a complex and expensive technique since it requires the use of an optical spectrum analyser. This technique is further limited with regard to the acquisition frequencies.

SUMMARY OF THE INVENTION

The aim of the present invention is to overcome the drawbacks of the known techniques, mentioned above.

The main originality of the system which is the subject of the invention resides in the use of at least one pair of Bragg gratings, each of which has the double function of transduction and of analysis.

These two gratings are overall identical, except with regard to their spectral sensitivities (relative to the quantity to be measured) which are slightly different from each other. Joint analysis of the two gratings thus allows a differential measurement which does not require an accurate spectral analysis.

The system which is the subject of the invention enables several types of physical quantities to be measured, in particular temperatures, stresses and pressures and this, in a less expensive way than the known techniques mentioned above.

In particular, this system is capable of using apodized gratings, which are easier to manufacture than the chirped gratings used in the technique disclosed by document [2], and much less sensitive than the latter to spectral distortions.

More specifically, the subject of the present invention is a system for measuring at least one parameter, this system comprising at least one optical sensor, this system being characterized in that each sensor comprises two Bragg gratings, these Bragg gratings having respective sensitivities which are adjusted so that the respective spectra of the two gratings have a relative spectral shift which depends on the parameter or parameters to be measured, these Bragg gratings being respectively written in two optical waveguides, the system further comprising an optical source provided in order to supply light to the two optical waveguides in order to interrogate the latter, means enabling the light to pass successively through the two Bragg gratings of the same sensor, photodetectors in order to measure, on the one hand, the power level of light having passed only through one of the two optical waveguides and, on the other hand, the power level of light having passed successively through the two optical waveguides, and means to process these power levels and supply the values of the parameter or parameters measured.

The optical waveguides may advantageously be the respective cores of optical fibres each having a single core or the cores of a multicore optical fibre.

According to a preferred embodiment of the system which is the subject of the invention, this system further comprises a circulator which connects the optical source to the two optical waveguides.

According to another preferred embodiment of the system which is the subject of the invention, the number N of optical sensors of this system is at least equal to two, the optical source of this system is capable of emitting in a wavelength band ranging at least from the shortest to the longest of the respective resonant wavelengths of these sensors, and the system comprises spectral separation means capable of distributing the light having traversed the N optical sensors over N first photodetectors, capable of measuring N first light power levels of light having these wavelengths and having passed only through one of the two optical waveguides, and over N second photodetectors, capable of measuring N second light power levels of light having these wavelengths and having passed successively through the two optical waveguides.

Preferably, the system further comprises a circulator which connects the optical source to the two optical waveguides, a first optical coupler and first and second spectral separation devices, the first optical coupler being connected between the circulator and one of the two optical waveguides in order to enable the signal reflected by one of the two Bragg gratings and the signal reflected by these two Bragg gratings to be analysed by the first and second spectral separation devices, respectively.

The system may further comprise a 2×2 switch which is coupled, on one side, to the first optical coupler and to the circulator and, on the other side, to the two optical waveguides.

The system may also comprise a second optical coupler and a third spectral separation device which is connected to the optical source via this second optical coupler in order to analyse the light emitted by the optical source.

The Bragg gratings are preferably apodized gratings.

According to a particular embodiment of the system which is the subject of the invention, the parameter is a strain and the respective longitudinal axes of the two Bragg gratings make different angles with the axis of the strain.

According to another particular embodiment, the parameter is a strain and the system further comprises a support comprising two parts whose respective cross sections are different, the two Bragg gratings being respectively placed in these two parts.

According to another particular embodiment, the two Bragg gratings are respectively written in the two cores of a dual-core optical fibre, these two cores being different from each other so as to give different measuring sensitivities to the Bragg gratings written in these cores.

In this case, the two cores may have different dopings or different diameters.

According to another particular embodiment, the two Bragg gratings have different sheaths making it possible to adjust their sensitivity with respect to each parameter to be measured.

Each spectral separation device may comprise a dispersive element, for example a diffraction grating or a prism, and photodetectors which may form a matrix.

In this case, according to one particular embodiment, there may be just one dispersive element common to the spectral separation devices and the photodetectors may be different lines of the same photodetector matrix.

As a variant, each spectral separation device may comprise an optical divider together with interference filters and photodetectors which are associated with this optical divider.

BRIEF DESCRIPTION OF THE DRAWINGS

The present invention will be better understood on reading the description of exemplary embodiments given below, by way of purely indicative and non-limiting example, with reference to the appended drawings in which:

FIGS. 9A and 9B are schematic views of strain sensors, each sensor comprising two Bragg gratings placed in a support having parts whose cross sections are different, FIG. 10 illustrates schematically an example of the differential packaging between the two Bragg gratings of the sensor of a system according to the invention, FIG. 11 is a schematic view of a multicore optical fibre which can be used in the invention.

DETAILED DESCRIPTION OF PARTICULAR EMBODIMENTS

Figure 1:
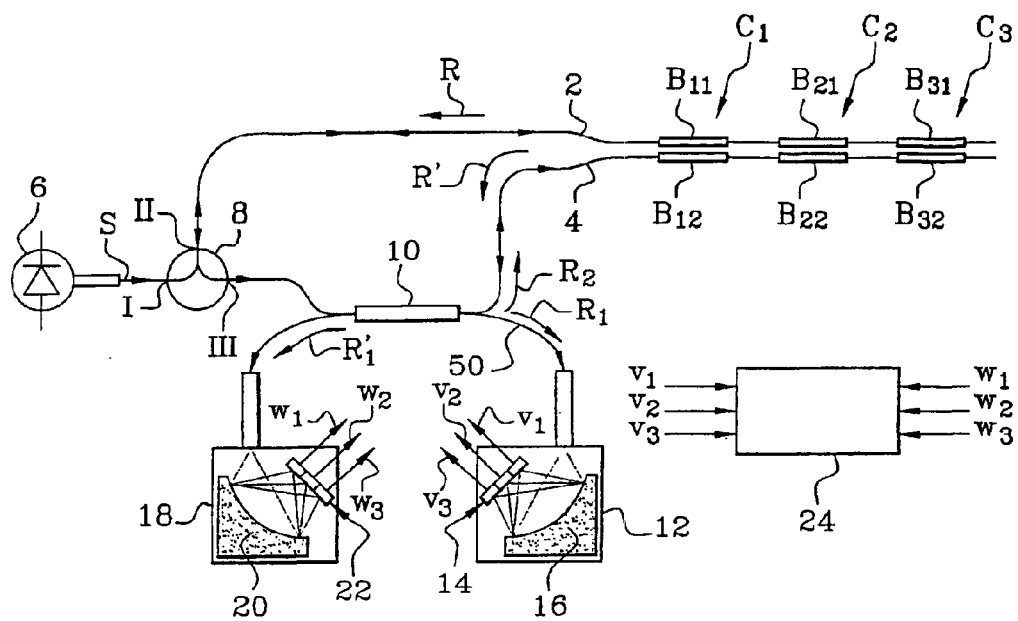
FIG. 1 illustrates schematically a measurement system according to the invention using three differential pairs of Bragg gratings.

One example of the system which is the subject of the invention is schematically shown in FIG. 1. In this example, three sensors $C_1$, $C_2$ and $C_3$ are used. The sensor $C_1$ (or $C_2$, $C_3$ respectively) comprises two Bragg gratings $B_{11}$, $B_{12}$ (or $B_{21}$, $B_{22}$ or $B_{31}$, $B_{32}$ respectively) each forming a transducer.

The Bragg gratings $B_{11}$, $B_{21}$ and $B_{31}$ (or $B_{12}$, $B_{22}$ and $B_{32}$, respectively) are formed in an optical fibre 2 (or 4, respectively).

The Bragg gratings $B_{11}$ and $B_{12}$ have a resonant wavelength $\lambda_1$, the Bragg gratings $B_{21}$ and $B_{22}$, a resonant wavelength $\lambda_2$ and the Bragg gratings $B_{31}$ and $B_{32}$, a resonant wavelength $\lambda_3$.

At the input to this system, there is first of all a broadband fibre optical source 6, emitting in the infrared, typically around 1.5 µm (but any other spectral band could be used). The spectral bandwidth of the source 6 depends on the number of sensors to be interrogated.

If, by way of example, a spectral variation of 10 nm is allowed on each transducer (which is equivalent to a 1% extension on a fibre), a total spectral bandwidth greater than 30 nm can be taken in the case of the example of FIG. 1. In practice, it is the useful spectral bandwidth of the source and the dynamic measurement range respectively associated with the gratings which set the number of sensors.

The light signal S from the source 6 then arrives at an optical fibre circulator 8, with three channels, I, II and III. The signal S enters therein via the channel I and exits therefrom via the channel II.

The light wave guided in the fibre 2 (connected to the channel II) thus encounters the various Bragg gratings forming the first transducers associated with the various sensors. Part of the signal is therefore reflected at the resonant wavelengths of the various gratings $\lambda_1$, $\lambda_2$ and $\lambda_3$.

The circulator then directs the reflected signal R towards the channel III and therefore towards an optical coupler 10 of the 50/50 type which is connected to this channel III.

A first half $R_1$ of R is guided towards a spectral separation device 12 and the other half $R_2$ is directed towards the fibre 4.

$R_1$ is spectrally separated into three fields over the three photodetectors of a photodetection assembly 14 of which the device 12 consists. The power levels from these three photodetectors are called $v_1$, $v_2$ and $v_3$, respectively. These three photodetectors correspond respectively to the ranges of variation of $\lambda_1$, $\lambda_2$ and $\lambda_3$.

In practice, any spectral separation means 16 can be used (for example a diffraction grating, bulk filter, Bragg grating or thin films) in order to carry out this separation upstream of the photodetectors. We will return to this matter later.

$R_2$ is transmitted to the complementary fibre 4 and therefore encounters the second series of Bragg gratings included in the three sensors. This signal is therefore reflected by each of the gratings (forming filters) in the form of a signal R' and is redirected in the opposite direction towards the coupler 10.

Half of R' is lost in this coupler while the other half $R'_1$ is directed towards a spectral separation device 18 identical to the device 12 and therefore comprising a spectral separation means 20 and an assembly 22 of three photodetectors. Thus, three power levels $w_1$, $w_2$ and $w_3$ from these three photodetectors are measured.

The system of FIG. 1 also comprises means 24 for processing the measured power levels $v_1$, $v_2$, $v_3$ and $w_1$, $w_2$, $w_3$. These processing means 24 are provided in order to supply the values of the parameter or parameters measured by virtue of the sensors $C_1$, $C_2$ and $C_3$.

In the system of FIG. 1, the fact that the signal is successively reflected by each of the two transducer gratings constituting each sensor is used. The signal R' therefore integrates the intersection of the reflection spectra of these two gratings. If the two spectra are superimposed, a maximum signal is obtained. If the two spectra are separate, the signal becomes zero. All the intermediate positions between these two extremes define the measurement region.

Thus, the two gratings, initially centred on $\lambda_i$ ($1 \leq i \leq 3$), are packaged or manufactured such that the overlap integral of their reflection spectra is a function of the parameter to be measured (for example temperature, stress or pressure).

Figure 2:
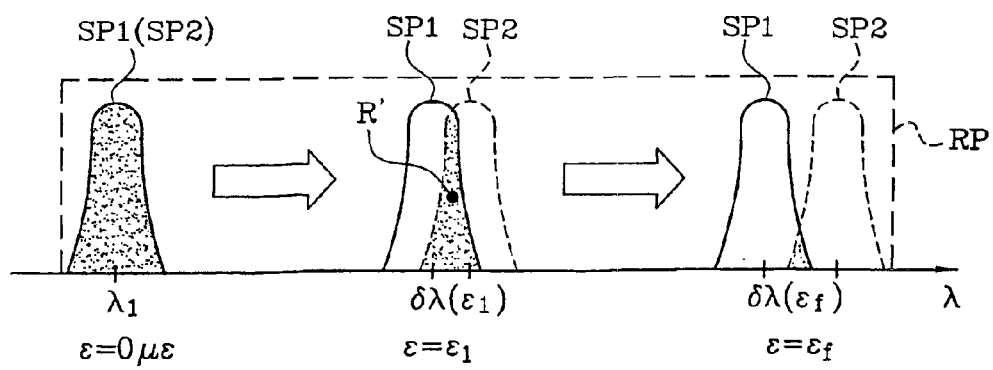
FIG. 2 illustrates schematically the principle of a measurement according to the invention using two reflection spectra from apodized Bragg gratings.

FIG. 2 shows the principle of the measurement using two Bragg gratings reflection spectra SP1 and SP2. The stress $\epsilon$ goes from 0 $\mu\epsilon$ to $\epsilon_f$ while passing through $\epsilon_1$.

As is shown by way of example in FIG. 2, when the stress $\epsilon$ increases on the sensor, a relative spectral shift $\delta\lambda(\epsilon)$ is introduced. As a result, the overlap integral of the two spectra decreases. If the power level corresponding to this intersection area R' is measured, it is thus possible to calculate the corresponding stress $\epsilon$.

Moreover, as we will see below, the Bragg gratings are preferably apodized in order to prevent power fluctuations caused by possible secondary lobes.

The region of FIG. 2, which is delimited by the dashed rectangle RP, represents the spectral bandwidth $D\lambda$ of the integration window (total shift of the gratings) corresponding to each photodetector of the spectral separation device.

The principle of the measurement will be explained below.

The signal S, which comes from the broadband source 6 of FIG. 1, depends on the wavelength $\lambda$ and this will therefore be called $S(\lambda)$ hereinbelow. Furthermore:

$r_1(\lambda)$ and $r'_1(\lambda)$ are the reflection coefficients of the two Bragg gratings of the sensor $C_1$, $\alpha_{ij}$ is the loss coefficient of the circulator 8 from channel i to channel j, where $I \leq i \leq III$, $II \leq j \leq III$, $i<j$, and $\gamma$ is the degree of separation of the coupler 10 ($\gamma=0.5$ in the example of FIG. 1).

The signal $R_1(\lambda)$ is reflected only by the first grating $B_{11}$ then it falls on the spectral separation device 12. It can be written as:

$$R_1(\lambda) = \alpha_{12} \times \alpha_{23} \times \gamma \times r_1(\lambda) \times S(\lambda)$$

The signal $R'_1(\lambda)$ reflected by the two gratings $B_{11}$ and $B_{12}$ of the sensor $C_1$ and falling on the second spectral separation device 18 can be written as:

$$R'_1(\lambda) = \alpha_{12} \times \alpha_{23} \times \gamma^2 \times r_1(\lambda) \times r'_1(\lambda) \times S(\lambda)$$

The spectral separation of the two output beams allows the signal to be integrated over a spectral bandwidth $[\lambda_0; \lambda_0+D\lambda]$ whose width takes the value $D\lambda$. The measured powers $v_1$ and $w_1$ can therefore be written as:

$$v_1 = \int_{\lambda_0}^{\lambda_0+D\lambda} \alpha_{12} \times \alpha_{23} \times \gamma \times r_1(\lambda) \times S(\lambda) \times d\lambda$$

$$w_1 = \int_{\lambda_0}^{\lambda_0+D\lambda} \alpha_{12} \times \alpha_{23} \times \gamma^2 \times r_1(\lambda) \times r'_1(\lambda) \times S(\lambda) \times d\lambda$$

If the integration is carried out over $D\lambda$, in reality, only a small spectral bandwidth $\Delta\lambda_r$ must be taken into account in the calculation of the integrals. This is the bandwidth over which $r_1(\lambda) \times r'_1(\lambda)$ is different from zero. This bandwidth $\Delta\lambda_r$ remains less than twice the bandwidth of the filter formed by the Bragg grating.

Since this bandwidth is quite narrow ($\Delta\lambda_r<1$ nm), it is therefore reasonable to assume that $S(\lambda)$ and the various coefficients $\alpha_{ij}$ and $\gamma$ are constant over the integration range. The equations can therefore be simplified as follows:

$$v_1 = \alpha_{12} \times \alpha_{23} \times \gamma \times S(\lambda_1) \times \int_{\Delta\lambda_r} r_1(\lambda) \, d\lambda$$

$$w_1 = \alpha_{12} \times \alpha_{23} \times \gamma^2 \times S(\lambda_1) \times \int_{\Delta\lambda_r} r_1(\lambda) \times r'_1(\lambda) \, d\lambda$$

If the ratio of these various quantities is calculated, the dependence on the value of the source signal $S(\lambda_1)$ is removed. As a result, the system response is independent of the power fluctuations of the optical source and of any variations in the sensitivity of the photodetector. This leads to:

$$\frac{w_1}{v_1} = \gamma \times \frac{\int_{\Delta\lambda_r} r_1(\lambda) \times r'_1(\lambda) \, d\lambda}{\int_{\Delta\lambda_r} r_1(\lambda) \, d\lambda}$$

The two gratings forming the sensor are assumed to be identical (they are manufactured under the same conditions). Their spectral reflection coefficient may therefore be expressed as a function of a normalized reflection coefficient $r_1^0(\lambda)$.

Because they are used in an external medium, losses may possibly appear from one fibre to another. They are taken into account in this equation by virtue of the factors $\rho_1$ and $\rho'_1$ such that:

$$r_1(\lambda) = \rho_1 \times r_1^0(\lambda)$$

$$r'_1(\lambda) = \rho'_1 \times r_1^0(\lambda - \delta\lambda)$$

The previous ratio can therefore be written as follows, where $\delta\lambda$ is the relative spectral shift mentioned above:

$$\frac{w_1}{v_1} = \gamma \times \rho'_1 \times \Gamma_1(\lambda_1, \delta\lambda) \quad (1)$$

The main unknown in equation (1) is:

$$\Gamma_1(\delta\lambda) = \frac{\int_{\Delta\lambda_r} r_1^0(\lambda) \times r_1^0(\lambda - \delta\lambda) d\lambda}{\int_{\Delta\lambda_r} r_1^0(\lambda) d\lambda}$$

Equation (1) therefore gives the result of the measurement for channel I of the circulator. If it is assumed that the term for losses is due to the connection (splicing along the fibres for example), it can be assumed that it is identical for all the gratings of the same fibre, and the total result over the three channels (as for FIG. 1) can therefore be written:

$$\frac{w_1}{v_1} = \gamma \times \rho'_1 \times \Gamma_1(\delta\lambda) \quad (2a)$$

$$\frac{w_2}{v_2} = \gamma \times \rho'_1 \times \Gamma_2(\delta\lambda) \quad (2b)$$

$$\frac{w_3}{v_3} = \gamma \times \rho'_1 \times \Gamma_3(\delta\lambda) \quad (2c)$$

The system of equations (2a), (2b) and (2c) shows that there is no direct access to the values of $\Gamma_i$ ($1 \leq i \leq 3$) because of the losses term $\rho'_1$. Several solutions can be considered in order to eliminate this term. We will describe a few of them hereinbelow.

Figure 3:
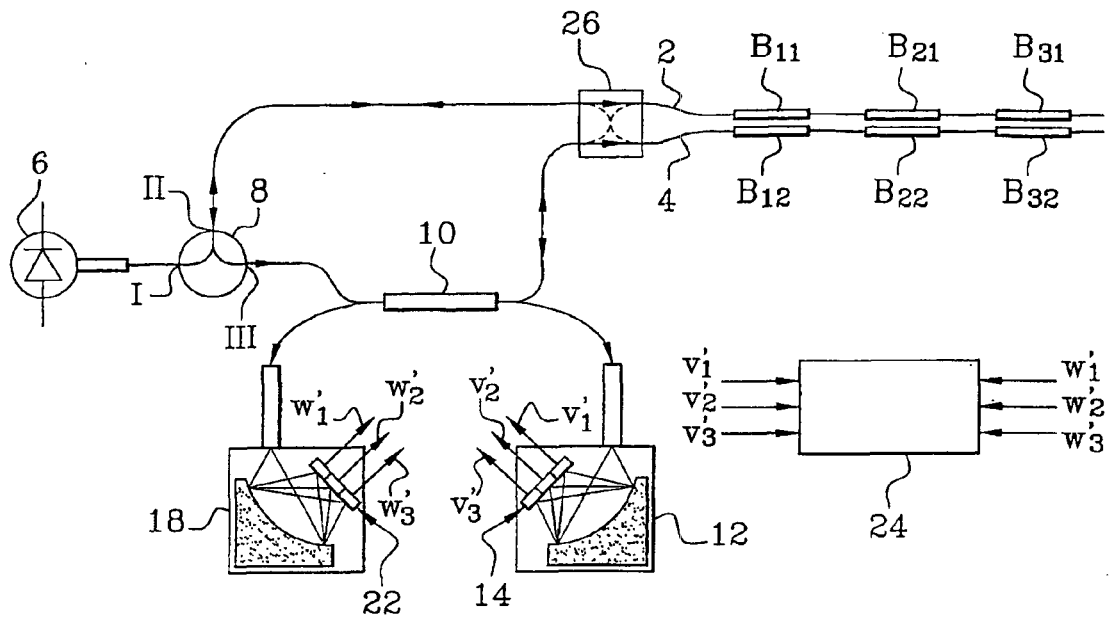
FIG. 3 is a schematic view of a particular embodiment of the system which is the subject of the invention.

A first solution consists in modifying the system of FIG. 1 by placing a 2×2 optical switch, referenced 26, at the input of the two fibres 2 and 4 as shown in FIG. 3.

This switch 26 is connected, on one side, to the coupler 10 and to the channel II of the circulator 8 and, on the other side, to the fibres 2 and 4.

In this case, switching enables the coefficient $\rho'_1$ of the second fibre to be replaced by the coefficient $\rho_1$ of the first, in equations (2a) to (2c). A loss coefficient $\beta$, arising from the switch 26, is also introduced. Equations (2a) to (2c) then become:

$$\frac{w'_1}{v'_1} = \gamma \times \beta \times \rho_1 \times \Gamma_1(\delta\lambda)$$

$$\frac{w'_2}{v'_2} = \gamma \times \beta \times \rho_1 \times \Gamma_2(\delta\lambda)$$

$$\frac{w'_3}{v'_3} = \gamma \times \beta \times \rho_1 \times \Gamma_3(\delta\lambda)$$

In these equations, the powers supplied by the three photodetectors of the assembly 14 (or 22, respectively) are now called $v'_1$, $v'_2$ and $v'_3$ (or $w'_1$, $w'_2$ and $w'_3$, respectively).

It is thus possible to choose the configuration which gives the result with the greatest dynamic range (the smallest loss coefficient).

This configuration is also a means of identifying and correcting possible point losses on one of the fibres.

If a fibre is damaged between the first two gratings of this fibre, for example the gratings $B_{11}$ and $B_{21}$ of fibre 2, for example because of a high local curvature, one of the coefficients $\rho$ (for example $\rho'_1$) changes from one measurement on one grating to the other (and then takes values $\rho'_{1a}$ and $\rho'_{1b}$). This then gives:

$$\frac{\frac{w_1}{v_1}}{\frac{w_2}{v_2}} = \frac{\rho'_{1a}}{\rho'_{1b}} \times \frac{\Gamma_1(\delta\lambda)}{\Gamma_2(\delta\lambda)} \text{ and } \frac{\frac{w'_1}{v'_1}}{\frac{w'_2}{v'_2}} = \frac{\Gamma_1(\delta\lambda)}{\Gamma_2(\delta\lambda)}$$

Since, by definition, $\rho'_{1a}$ is greater than $\rho'_{1b}$, the correct value of the two ratios above is the smallest value.

A second solution consists in sacrificing a sensor.

If it is assumed that one of the grating pairs is placed in a protected environment, the function $\Gamma(\delta\lambda)$ will always be equal to $\Gamma(0)$. The ratio w/v therefore allows us to measure the loss coefficient $\rho'_1$. The other two ratios then give us the desired measurements. Note that this requires sacrificing a pair of Bragg gratings.

A third solution consists in carrying out differential measurements.

The three equations (2a), (2b) and (2c) enable $\Gamma_1(\delta\lambda)/\Gamma_2(\delta\lambda)$, $\Gamma_1(\delta\lambda)/\Gamma_3(\delta\lambda)$ and $\Gamma_2(\delta\lambda)/\Gamma_3(\delta\lambda)$ to be measured. Access is therefore provided, for example, to the relative distribution of the stresses at three points. The measurement therefore remains differential and it is not possible to give an absolute value of the strain.

The advantage of this solution is of course that it is not necessary to sacrifice a pair of gratings. This solution shows its full potential when considering a large number of sensors together, the latter allowing strains to be accurately mapped, and an electric gauge, placed at the side of one of the sensors, this gauge providing an absolute reference of the overall measurement.

The ratio of the signals from two sensor pairs which are close enough furthermore enables fluctuations in the loss factor $\rho$ inside the fibres to be eliminated. This is even more the case if a configuration including an optical switch is considered.

A fourth solution consists in standardizing the source.

If the presence of the loss term is really unacceptable for the operation of the system, an additional standardization channel can be added to the system.

This relates to applications in which the fibre links between the sensors are not protected (which is the case when monitoring very large structures such as works of art and the inclusion of sensors into composite materials).

Figure 4:
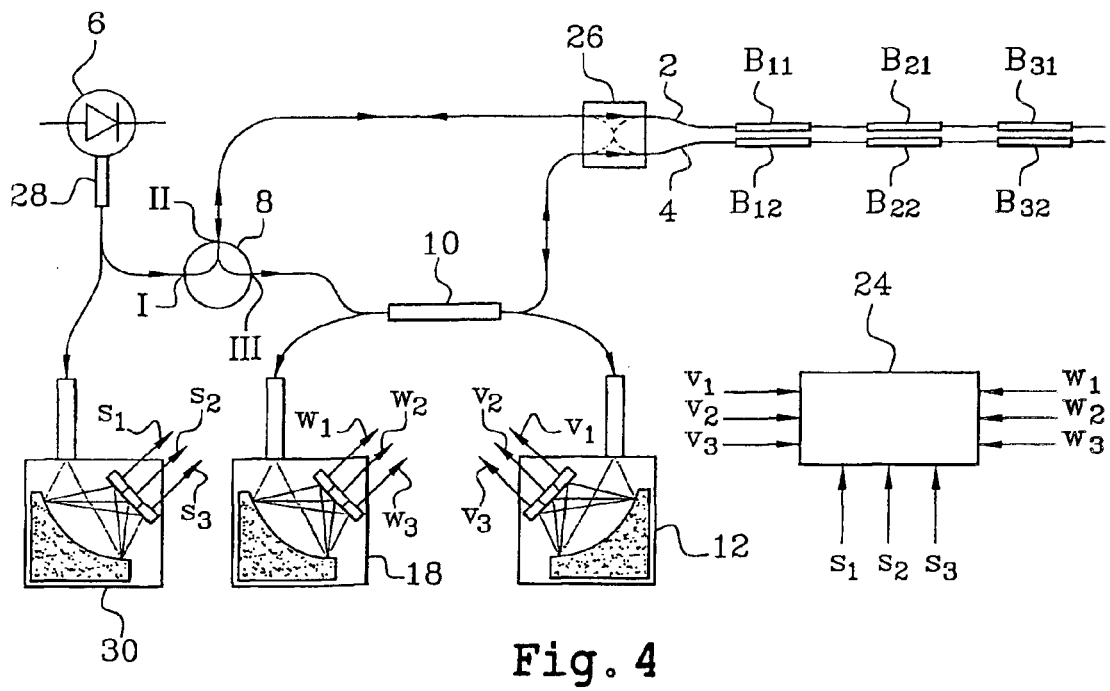
FIG. 4 is a schematic view of another particular embodiment of the system which is the subject of the invention.

This standardization is schematically illustrated in FIG. 4. An additional coupler 28 is placed at the output of the source 6. One channel of this coupler 28 is connected to the channel I of the circulator 8 in order to send a portion 1−v of the light emitted by the source 6 thereto. The other channel of this coupler sends a portion v of this light to an additional spectral separation device 30.

The device 30 is identical to the devices 12 and 18 and the respective powers supplied by the three photodetectors of these devices 30 are called $s_1$, $s_2$ and $s_3$. Note that the powers $s_1$, $s_2$ and $s_3$ are then also sent to the processing means 24 for the standardization.

A signal $s_1$ for example, given below (by assuming that the source has a constant power $S(\lambda_1)$ over the integration range $D\lambda$) is therefore acquired:

$$s_1 = v \times S(\lambda_1) \times D\lambda$$

which gives:

$$\frac{w_1 \times s_1}{v_1 \times v_1'} = \frac{v}{1-v} \frac{1}{\alpha_{12} \times \alpha_{23}} \frac{D\lambda}{\int_{\Delta\lambda_r} r_1^0(\lambda) \, d\lambda} \frac{\int_{\Delta\lambda_r} r_1^0(\lambda) r_1^0(\lambda - \delta\lambda) \, d\lambda}{\int_{\Delta\lambda_r} r_1^0(\lambda) \, d\lambda}$$

It can therefore be seen that the dependence with respect to fibre losses is removed, as is the dependence of the source 6 on the fluctuations. The measurement is carried out around the previous term $\Gamma(\delta\lambda)$.

In the equation, the integration range $D\lambda$ is involved in a ratio where the bandwidth of the Bragg grating appears, and must therefore be accurately known, especially by virtue of a prior characterization of the system.

This solution allows a completely standardized characterization of the sensor system. On the other hand, it requires having a source which is stable over the integration ranges of the spectral separation devices.

Let us now study the function $\Gamma(\delta\lambda)$. It may be considered as a "semi-normalized" autocorrelation function. For measurement purposes, it would ideally be expressed in the form of a normalized linear application such as:

$$\Gamma(\delta\lambda) = \frac{\delta\lambda}{\delta\lambda_{max}}$$

This would effectively be the case if the spectral response of the gratings had the shape of a "gate" function.

Figure 5:
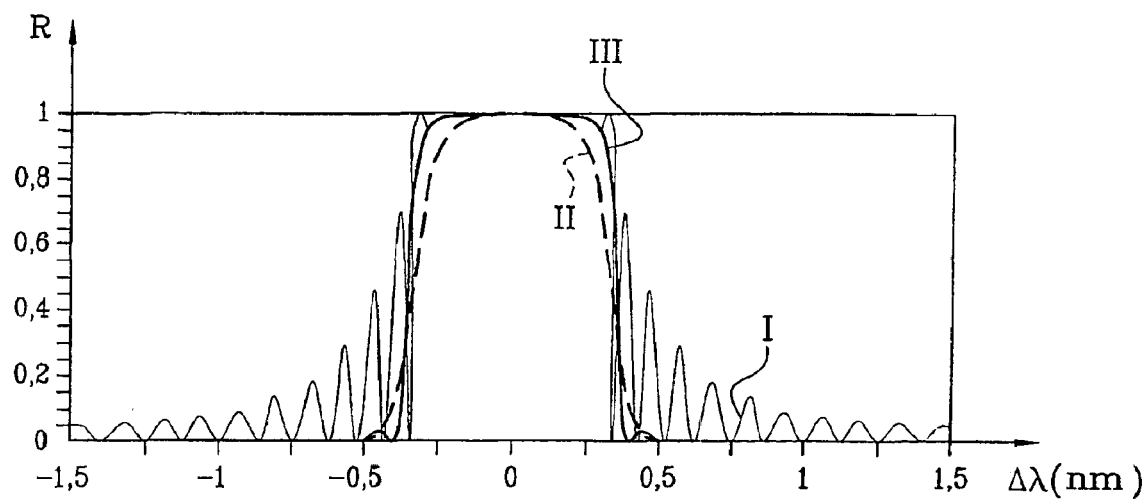
FIG. 5 shows the variations in the spectral reflection coefficient as a function of a shift with respect to a central wavelength, for three types of gratings used to model an autocorrelation function.
Figure 6:
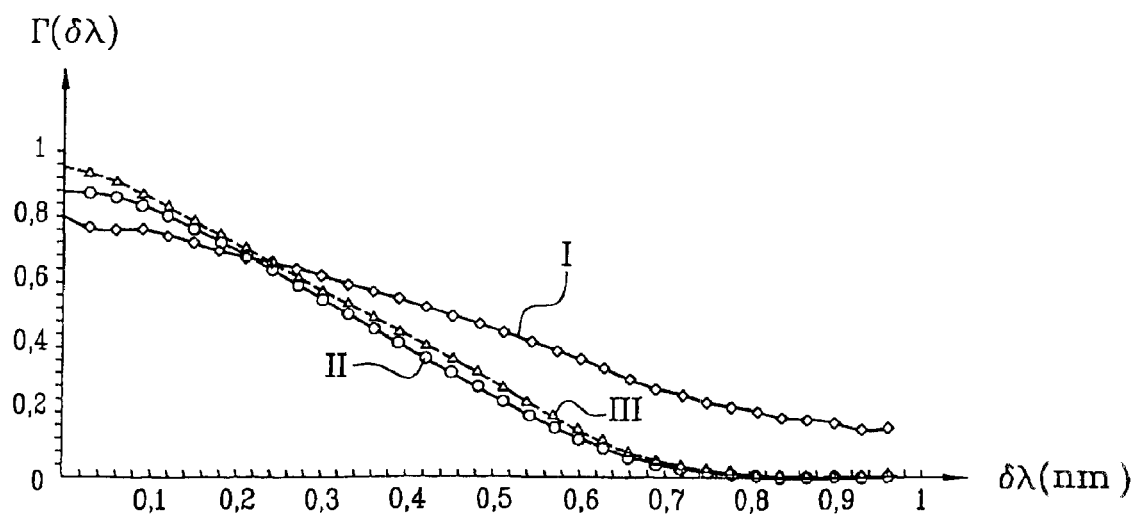
FIG. 6 illustrates schematically the modelling of the autocorrelation function in the case of a uniform Bragg grating, of a gaussian apodization grating and of a super-gaussian apodization grating.

FIGS. 5 and 6 give examples of autocorrelation functions depending on the Bragg gratings used. The following cases have been envisaged:

uniform grating (I) L=6 mm; $\Delta n = 8 \times 10^{-4}$

Gaussian apodization grating (II) L=6 nm; G=2; p=2; $\Delta n = 8 \times 10^{-4}$ supergaussian apodization grating (III) L=6 nm; G=4; p=1.5 and $\Delta n = 8 \times 10^{-4}$ The apodizations have been calculated from the function:

$$g(\lambda) = \exp\left(-\frac{(\lambda - \lambda_B)^G}{(L/2p)^G}\right)$$

The reflection coefficients R of these three types of gratings have been plotted in FIG. 5. It is noticeable that the Gaussian apodization shows a strong resemblance to a gate function. The presence of very large secondary lobes are also noticeable in the case of the uniform grating.

Note that the curves are plotted with respect to the shift $\Delta\lambda$ from the central wavelength.

FIG. 6 shows the result of modelling the autocorrelation function, taken for a maximum relative spectral shift $\delta\lambda_{max}$ of 1 nm. The two gratings forming the sensor are assumed to be packaged so as to give a good dynamic measurement range. In this example, they are inclined by 13.2°, a matter to which we will return.

It is noticeable that the curve which provides the greatest dynamic range and which most closely approaches the straight line corresponds to the case of the supergaussian apodization. In contrast, the case of the uniform Bragg grating shows a poor dynamic range and considerable fluctuations. It is therefore necessary that the apodization given to the gratings used in the system be chosen carefully.

A large part of the design of the measurement system, subject of the invention, relates to the means of obtaining a difference in the response of the Bragg grating pair of the same sensor. First of all, the principle of this relative shift will be presented in detail.

As has been seen, the spectral response of a Bragg grating is the reflection of a fine band (having a bandwidth of about 100 pm) of the incident optical signal. This band is centred on a wavelength of resonance $\lambda_B$, the Bragg wavelength, which is given by the following equation:

$$\lambda_B = 2 \times n_{eff} \times \Lambda$$

where $\Lambda$ is the period of the grating and $n_{eff}$, the effective index of the mode which is propagated in the fibre where the grating is formed.

On modifying a physical quantity in the vicinity of the grating, the parameters $\Lambda$ and $n_{eff}$ vary, which causes a shift $\Delta\lambda_B$ in the Bragg wavelength. Measurement of this shift is the basic principle of Bragg grating measurements.

The equation which links the spectral shift to the physical quantities constituted by a longitudinal stress $\epsilon_z$, a temperature $\Delta T$ and a pressure $\Delta P$ is as follows:

$$\frac{\Delta\lambda_B}{\lambda_B} = (1 - p_e) \times \epsilon_z + (\alpha + \zeta) \times \Delta T - \frac{1-2v}{E}\left[1 - \frac{n_c^2}{2}(2p_{12} + p_{11})\right] \times \Delta P$$

where $$p_e = n_c^2[p_{12} - v(p_{11} + p_{12})]/2,$$

$n_c$ is the optical index of the core of the fibre,
$p_{11}$ and $p_{12}$ are the elastooptic coefficients,
$v$ is Poisson's ratio (v=0.17),
$\alpha$ is the thermal expansion coefficient ($\alpha = 0.45 \times 10^{-6}$ K$^{-1}$),
$\zeta$ is the thermooptic coefficient, and
E is Young's modulus (E=$7 \times 10^{10}$ N/m$^2$).

The method used here assumes that the range of variation of the quantity to be studied is known a priori. Take the example of stresses.

As shown in FIG. 2, when the maximum strain is attained, the two gratings must be separated by their spectral bandwidth (a few hundred picometres).

Figure 7:
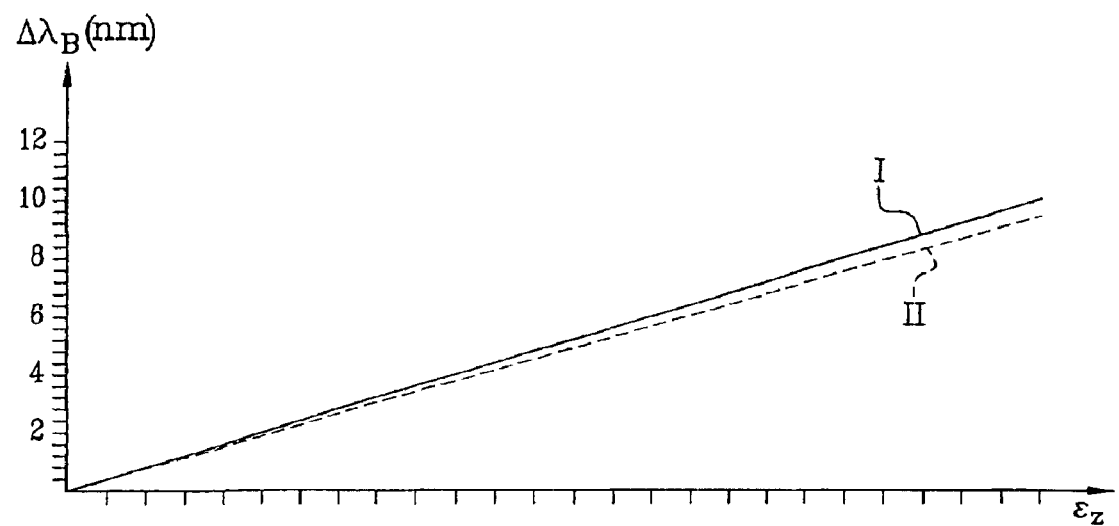
FIG. 7 illustrates schematically an example of the change in responses made by two Bragg gratings forming a sensor, to stress.

The intended change in response to the extension of two gratings of a sensor in the case of a total shift of 10 nm and a final differential shift of 500 pm is shown in FIG. 7. The stress $\epsilon_z$ is plotted on the x-axis and the shift $\Delta\lambda_B$ is plotted on the y-axis. The curves I and II correspond respectively to the two gratings of the sensor.

The packaging of the two gratings forming a single sensor therefore depends mainly on:

the spectral bandwidth of the gratings used, and the desired measurement range ($\epsilon_{max}$, $\Delta T_{max}$ or $\Delta P_{max}$, for example).

We will propose below various solutions which use a particular packaging for the two Bragg gratings or which benefit from the physical properties of the shift in wavelength of these gratings.

Figure 8:
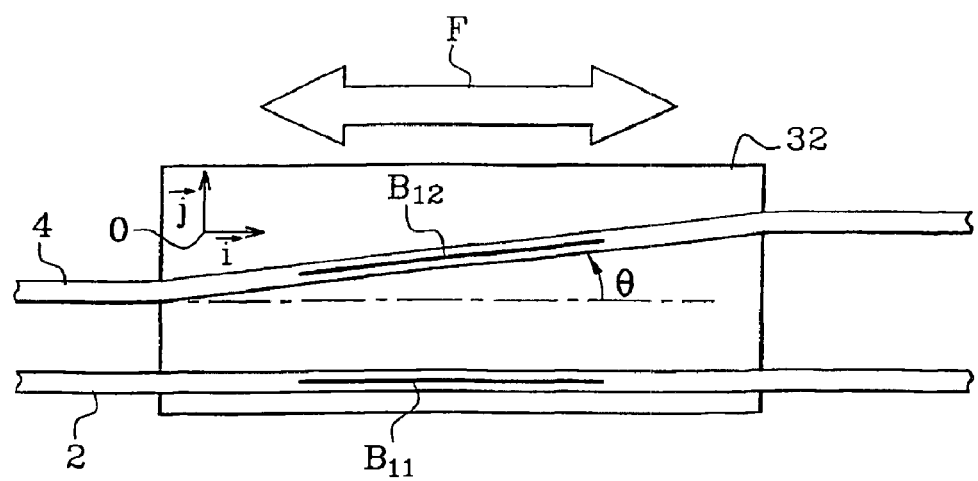
FIG. 8 is a schematic view of a strain sensor comprising two Bragg gratings forming different angles with respect to the axis of the strain.

A first solution consists in angularly shifting the two Bragg gratings, as shown in FIG. 8.

In the example of FIG. 8, the two Bragg gratings $B_{11}$ and $B_{12}$ of the sensor $C_1$ are considered, which are formed respectively in the cores of fibres 2 and 4. In this example, the portions of fibres, in which the gratings are formed, are rigidly secured to a deformable support 32.

An orthonormal coordinate system (0, $\vec{i}$, $\vec{j}$) is defined on this support.

Let us consider a deformation F along $\vec{i}$. The strain tensor for the grating support can be written:

$$\varepsilon = \begin{pmatrix} \varepsilon_i & 0 \\ 0 & -\nu\varepsilon_i \end{pmatrix}$$

The grating $B_{11}$ is parallel to $\vec{i}$ and therefore collinear with the axis of the strain, hence:

$$\epsilon_1 = \epsilon_i$$

The grating B12 forms an angle $\theta$ with the grating $B_{11}$. This grating $B_{12}$ is therefore collinear with the vector $(\cos(\theta), \sin(\theta))$ and the strains which are applied thereto are given by the equation:

$$\varepsilon_2 = \left( \begin{bmatrix} \varepsilon_i & 0 \\ 0 & -\nu\varepsilon_i \end{bmatrix} \times \begin{pmatrix} \cos(\theta) \\ \sin(\theta) \end{pmatrix} \right) \cdot \begin{pmatrix} \cos(\theta) \\ \sin(\theta) \end{pmatrix}$$

From this we deduce:

$$\epsilon_2 = \epsilon_1 \times [\cos^2(\theta) - \nu \sin^2(\theta)]$$

The values of the wavelength shifts for the two gratings $B_{11}$ and $B_{12}$ are therefore respectively:

$$\Delta\lambda_{B1} = (1-p_e) \times \lambda_B \times \epsilon_1$$

$$\Delta\lambda_{B2} = (1-p_e) \times \lambda_B \times \epsilon_1 \times [\cos^2(\theta) - \nu \sin^2(\theta)]$$

This leads to the expression for the differential shift of the two gratings:

$$\delta\Delta\lambda_B = (1-p_e) \times \lambda_B \times \epsilon_1 \times \sin^2(\theta) \times (1+\nu)$$

If $\epsilon_{max}$ is the maximum strain value and $\Delta\lambda_r$ the spectral grating bandwidth, the value of the angle $\theta$ can be deduced therefrom:

$$\sin^2(\theta) = \frac{\Delta\lambda_r}{(1-p_e) \times \lambda_B \times \varepsilon_{max} \times (1+\nu)}$$

By way of example, let $1-p_e=0.78$, $\lambda_B=1550$ nm and $\nu=0.17$.

For $\epsilon_{max}=0.01$ and $\Delta\lambda_r=500$ pm, this gives:

$$\theta = 0.19 \text{ radian} = 10 \text{ degrees}$$

It is noticeable that, in this configuration, the sensor is insensitive to temperature since it is not directional. The spectra of the two gratings are shifted in parallel in the spectral domain for a temperature change but without a relative shift. Only the variation in extension through the effect of heat is measured.

A second solution consists in exploiting the equation which links the strain of a solid to its cross section.

A solid of cross section S subjected to a force F undergoes an extension $\epsilon$ given by Hooke's law, where E is the Young's modulus of the solid:

$$\varepsilon = \frac{F}{S \times E}$$

The second solution then consists in packaging the two gratings $B_{11}$ and $B_{12}$ in a support 34, for example made of a polymer, as shown in FIGS. 9A and 9B. The gratings are differentiated by a change in cross section of the support.

More specifically, the support 34 comprises two parts 36 and 38, the respective cross sections $S_1$ and $S_2$ of which are different and which contain the gratings $B_{11}$ and $B_{12}$, respectively. These gratings are parallel and the strain F takes place parallel to these gratings. In the case of FIG. 9A (or 9B, respectively) the part 38 is higher (or wider, respectively) than the part 36.

The method is continued in the same way as for the sensors $C_2$ and $C_3$ of FIG. 1.

Each support is placed on a structure (not shown), whose strains it is wished to measure, and fastened at its two ends onto this structure. Returning to FIGS. 9A and 9B, the strain F generates a force which results in two different strains on the gratings. If the respective lengths of parts 36 and 38 are called $L_1$ and $L_2$ and the total length of the support 34 is called L, an equation relating the extensions of the structure to the two parts of the support 34 can be found:

$$\varepsilon = \frac{L_1}{L}\varepsilon_1 + \frac{L_2}{L}\varepsilon_2$$

So:

$$\varepsilon_1 = \frac{S_2}{S_1}\varepsilon_2$$

Finally, where $\alpha = L_1/L$:

$$\delta\Delta\lambda_B = (1-p_e) \times \lambda_B \times \frac{S_1 - S_2}{S_1(1-\alpha) + S_2\alpha} \times \varepsilon$$

By way of example, let $1-p_e=0.78$, $\lambda_B=1550$ nm and $\alpha=0.5$.

For $\epsilon_{max}=0.01$ and $\Delta\lambda_r=500$ pm, we have:

$$S_1/S_2 = 0.96$$

It is possible to take, for example in the case of the geometry of FIG. 9A, a support 34 whose part 36 (or 38, respectively) has dimensions 1 mm×5 mm (or 1.04 mm×5 mm, respectively).

In this configuration also, only the strains are taken into account. Changes in temperature therefore affect the signal only in the case where they cause a strain of the structure. But this is quite normal since a strain gauge does not distinguish between the origins of the strains that it measures. The latter may be of thermo-mechanical origin.

A third solution consists in packaging the two fibres 2 and 4 differently, so that respond slightly differently with respect to an external quantity.

A simple example consists in depositing a layer of a material on one of the fibres, aroung the grating contained therein, as shown in FIG. 10 where the portion of the optical fibre 2, in which the grating $B_{11}$ is photowritten, is covered with a layer 40 of a material.

The core 3 (or 5, respectively) of the fibre 2 (or 4, respectively), in which the Bragg gratings such as the grating $B_{11}$ (or $B_{12}$, respectively) have been photowritten, can be seen in FIG. 10.

In the case of a temperature sensor, it is possible to use a metal coating which enhances the effect of expansion on one of the gratings. In the case of sensors embedded in a structure, it is possible to use a material having properties which are different from those of the structure. A material with a smaller Young's modulus thus allows a reduction in the strains undergone by one of the two gratings and therefore a differentiation in the spectral response to the strains.

A fourth solution consists in employing two fibres of different constructions for writing the Bragg gratings. The thermooptic and the elastooptic coefficients of the fibres then provide the differentiation. This solution has the advantage of not requiring any particular packaging while integrating the sensors into the structure to be instrumented.

By way of example, optical fibres 2 and 4 are used, the cores of which are doped differently from each other or which have different diameters.

A fifth solution consists in using a multicore optical fibre, that is to say, an optical fibre comprising a plurality of cores, instead of a plurality of optical fibres each having a single core. The Bragg gratings are then written in a plurality of cores of the multicore fibre and this plurality of cores is produced such that these Bragg gratings have a different sensitivity to the external parameters.

The example of a dual-core fibre 42 is schematically shown in FIG. 11. This fibre 42 contains two cores 44 and 46 which correspond to the cores of fibres 2 and 4, respectively, one advantage then being that a single fibre is used instead of two.

In the case of FIG. 11, the Bragg gratings $B_{11}$, $B_{21}$, $B_{31}$ (or $B_{12}$, $B_{22}$, $B_{32}$, respectively) are photowritten in the core 44 (or 46, respectively) of the fibre 42 in order to obtain the sensors $C_1$, $C_2$ and $C_3$ (since only the gratings $B_{11}$ and $B_{12}$ are shown in FIG. 11). By way of example, the two cores 44 and 46 have different dopings or different diameters.

Now let us consider the various solutions for the spectral separation of the various sensors of a system according to the invention.

FIG. 2 shows that, for the range of measurements in question, the reflection signal from a grating or from the "intersection" of the two gratings moves spectrally over a band with a width $D\lambda$. The detectors of FIG. 1, which supply the power levels $v_i$ and $w_i$ ($1 \leq i \leq 3$), therefore have to measure the change in the power over this band and this, exclusively, so as not to include the signal from adjacent sensors.

In this sense, a spectral separation is necessary on the two output channels of the system.

The design of this spectral separation is one of the key points of the system which is the subject of the invention. Because of the low performance required by the separation device, it is possible to use simple, inexpensive and low-volume detection.

Figure 12:
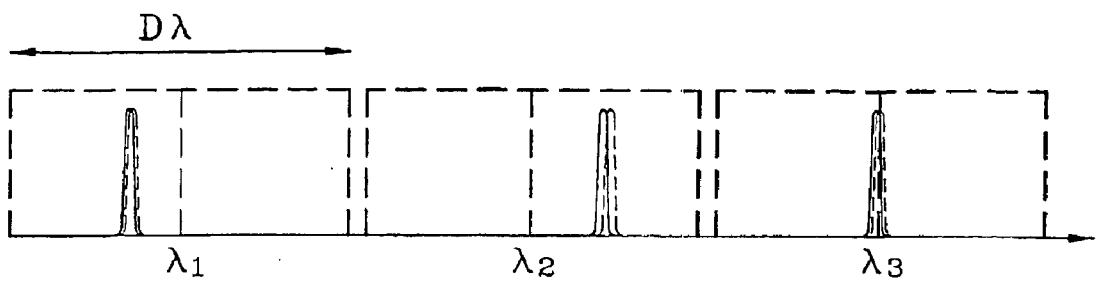
FIG. 12 illustrates schematically the principle of spectral separation over a band of width $D\lambda$, in the case where three sensors are used.

This device must in fact, as shown in FIG. 12, separate fairly broad ($D\lambda$ of about 10 nm) spectral bands spaced one from the others by a distance greater than $D\lambda$. The central wavelengths of these various bands have been called $\lambda_i$ ($1 \leq i \leq 3$), the example of FIG. 12 relating to three sensors.

Below, we give examples of a spectral separation device.

This device may comprise an angularly dispersive element.

Figure 13:
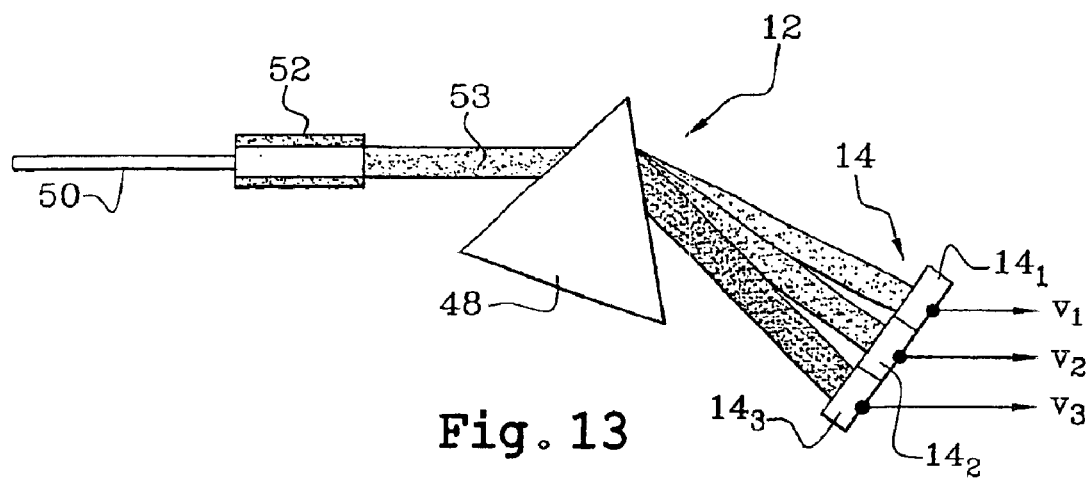
FIG. 13 illustrates schematically an example of a spectral separation device with a prism, useable in a system according to the invention, which comprises three sensors.

In the example of FIG. 13, this element is a prism 48. This FIG. 13 relates to three sensors $C_1$, $C_2$ and $C_3$ of FIG. 1 and relates to the light coming from the fibre 2 of this FIG. 1 after having traversed the circulator 8 and the coupler 10. A portion of the optical fibre 50, which connects this coupler 10 to the spectral separation device 12, can be seen.

The fibre 50 is first of all coupled to a collimator 52 so as to supply a parallel optical beam 53 to the input of the spectral separation device 12.

This beam falls on the prism 48, which angularly separates the three wavelengths $\lambda_1$, $\lambda_2$ and $\lambda_3$. The photodetectors $14_1$, $14_2$ and $14_3$ of FIG. 13 form the photodetector assembly 14 which, in this example, is a linear array 14 of three CCD detectors enabling the power distributed in the three wavelengths to be collected. Thus we have the signals $v_i$ ($1 \leq i \leq 3$). When the resonant wavelengths vary, the beams shift inside the detection surface of each of the elements of the linear array.

The same device may be used for the other output channel of the coupler 10 of FIG. 1.

As a variant, the devices 12 and 18 of FIG. 1 may share the same prism 48.

A diffraction grating may also be used in the place of the prism. The principle is still the same: a collimated optical signal is generated, which is diffracted by this grating and measured by a CCD linear array.

Figure 14:
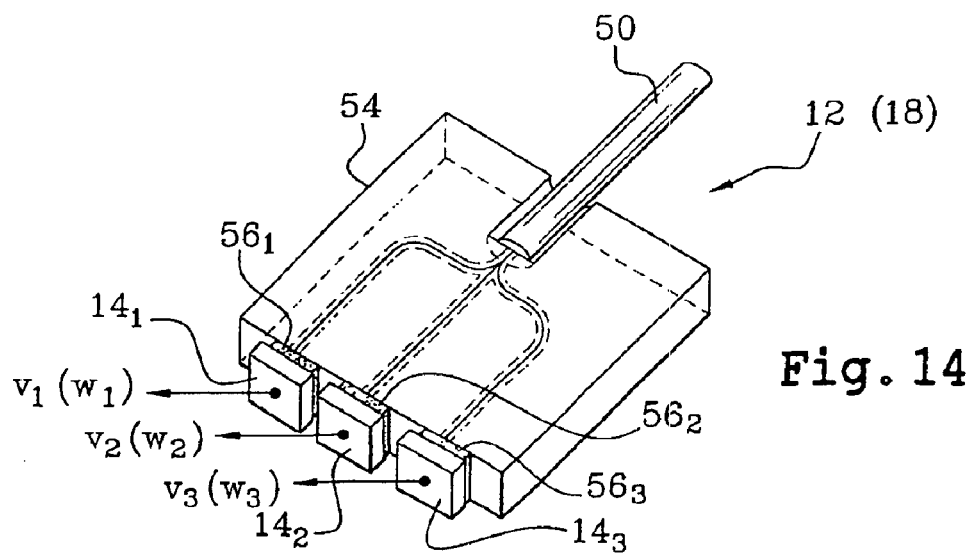
FIG. 14 illustrates schematically an example of a spectral separation device with an optical divider and interference filters, useable in a system according to the invention, which comprises three sensors.

Another example of an integrated spectral separation device 12 is schematically shown in FIG. 14. It uses an optical divider 54 and interference filters $56_1$, $56_2$ and $56_3$.

Band-pass interference filters having a spectral bandwidth of about 10 nm, or low-pass filters with a sharp falling edge, can in fact be found commercially.

As shown in FIG. 14, the fibre 50 is placed at the input of the optical divider 54. The signal is therefore distributed over three channels. An interference filter $56_1$ or $56_2$ or $56_3$ is placed at the end of each of the channels, followed by a photodetector $14_1$ or $14_2$ or $14_3$. If the filters $56_1$, $56_2$ and $56_3$ are band-pass filters which pass over the interval $D\lambda$, the desired signals $v_i$ will be directly recovered. If low-pass (or high-pass) filters are used, subtraction between the different channels is needed in order to obtain the correct measurement.

The device 18 of FIG. 1 and a device 30 of FIG. 4 can be produced in the same way as the device 12.

In the invention, the number of sensors capable of being multiplexed depends on many parameters, but in theory is not limited. These parameters are in particular:

the spectral bandwidth of the interrogating optical source, the spectral variation range $D\lambda$ of the gratings corresponding to the variations of the physical quantities to be measured, and the capacity of the spectral separation device.

The spectral bandwidths of the sources which are found commercially go from 40 nm to 80 nm. Moreover, the strain limit which a grating can reasonably undergo typically corresponds to a total spectral shift of 10 nm. It can therefore be considered that eight sensors per line is a reasonable order of magnitude. This value may be increased depending on the type of quantity to be measured.

Given the performance of the commercially available photodetectors, the system which is the subject of the invention may have a high acquisition frequency, of the order of a few MHz, or even more.

Other than the aforementioned characteristics, the system which is the subject of the invention has the various following advantages:

depending on its packaging, each sensor can be made insensitive to temperature.

The low performance required by the spectral separation of the channels makes the assembly a compact and inexpensive system.

By adding a 2×2 optical switch, the system can be made virtually independent of point losses occurring in the fibres.

This system can be independently interrogated at either end of the assembly of the two fibres, which makes it possible to continue the measurement in the case of fibre failure.

Returning to the present invention, a distinction should be made between:

the most general form of this invention, which does not use a circulator or spectral separation means and which is above all of benefit when there is only one optical sensor (but which could however be implemented with several optical sensors) and a particular form in which at least two optical sensors are used.

In this last case, a broadband source and spectral separation devices have to be used, but the use of circulators is not essential, although preferable.

By way of example, n optical sensors $C_1, C_2 \ldots C_n$ (n greater than or equal to 2), having resonant wavelengths $\lambda_1, \lambda_2, \ldots \lambda_n$, an optical source which emits in the wavelength band ranging at least from $\lambda_1$ to $\lambda_n$, and spectral separation means capable of distributing the light having passed through the n sensors over n photodetectors, which measure power levels $v_1, v_2, \ldots v_n$ and over n other photodetectors, which measure power levels $w_1, w_2, \ldots w_n$, are now used. Reference may be made, for example, to FIG. 1 where n is equal to 3.

Furthermore, returning to the example of FIG. 13, the prism used in this example may be shared by several spectral analysis devices.

For example, according to a particular embodiment, the devices 12 and 18 of FIG. 1 (or the devices 12, 18 and 30, respectively, of FIG. 4) may share the same prism or, more generally, the same spectral separation element. Detection is then carried out on a two-dimensional matrix of photodetectors rather than on a one-dimensional linear array of photodetectors. FIG. 13 may thus represent a top view of a stack of at least two fibres 50 and at least two collimators 52 facing the same prism 48. The assembly 14 is then a top view of a CCD matrix comprising at least one detection element per optical fibre.

What is claimed is:

1. System for measuring at least one parameter, the system comprising:
    at least one optical sensor, each optical sensor comprising two Bragg gratings, the two Bragg gratings having respective sensitivities adjusted so that respective spectra of the two Bragg gratings have a relative spectral shift that depends on the at least one parameter to be measured, the two Bragg gratings being respectively provided in two optical waveguides;
    an optical source configured to supply light to the two optical waveguides to interrogate the two optical waveguides;
    means enabling the light to pass successively through the two Bragg gratings of a same optical sensor;
    photodetectors configured to measure a power level of light having passed only through one of the two optical waveguides and to measure a power level of light having passed successively through the two optical waveguides; and
    means for processing the power levels and supplying values of the at least one parameter measured.

2. System according to claim 1, wherein the two optical waveguides are respective cores of optical fibers each having a single core.

3. System according to claim 1, wherein the two optical waveguides are cores of a multicore optical fiber.

4. System according to claim 1, further comprising a circulator configured to connect the optical source to the two optical waveguides.

5. System according to claim 1, wherein a number N of optical sensors in the system is at least equal to two, wherein the optical source of the system is configured to emit in a wavelength band ranging at least from a shortest to a longest of respective resonant wavelengths of the N optical sensors, and the system further comprises:
    a spectral separation device configured to distribute light having traversed the N optical sensors over N first photodetectors, configured to measure N first light power levels of light having the wavelengths and having passed only through one of the two optical waveguides, and over N second photodetectors, capable of measuring N second light power levels of light having the wavelengths and having passed successively through the two optical waveguides.

6. System according to claim 5, further comprising:
    a circulator configured to connect the optical source to the two optical waveguides;
    a first optical coupler; and
    first and second spectral separation devices,
    the first optical coupler being connected between the circulator and one of the two optical waveguides to enable a signal reflected by one of the two Bragg gratings and a signal reflected by the two Bragg gratings to be analyzed by the first and second spectral separation devices, respectively.

7. System according to claim 6, further comprising a 2×2 switch coupled, on a first side, to the first optical coupler and to the circulator and coupled, on a second side, to the two optical waveguides.

8. System according to claim 6, further comprising a second optical coupler and a third spectral separation device connected to the optical source by the second optical coupler to analyze the light emitted by the optical source.

9. System according to claim 1, wherein the two Bragg gratings are apodized.

10. System according to of claim 1, wherein the at least one parameter includes a strain, and respective longitudinal axes of the two Bragg gratings form different angles with an axis of the strain.

11. System according to claim 1, wherein the at least one parameter includes a strain, and the system further comprises a support comprising two parts whose respective cross sections are different, the two Bragg gratings being respectively placed in the two parts.

12. System according to claim 1, wherein the two Bragg gratings are respectively inscribed in two cores of a dual-core optical fiber, the two cores being different from each other to give different measuring sensitivities to the Bragg gratings inscribed in the two cores.

13. System according to claim 12, wherein the two cores have different dopings.

14. System according to claim 12, wherein the two cores have different diameters.

15. System according to claim 1, wherein the two Bragg gratings have different sheathing making it possible to adjust their sensitivity with respect to each parameter to be measured.

16. System according to claim 5, wherein each spectral separation device comprises a dispersive element and photodetectors.

17. System according to claim 5, wherein each spectral separation device comprises an optical divider together with interference filters and photodetectors associated with the optical divider.

18. System according to claim 16, wherein each dispersive element is unique and common to the spectral separation devices and the photodetectors are different rows of a same photodetector matrix.

* * * * *